United States Patent

Yamaura et al.

[11] 4,371,926
[45] Feb. 1, 1983

[54] INPUT/OUTPUT INFORMATION INDICATION SYSTEM

[75] Inventors: Mitsuru Yamaura, Hachioji; Ryotaro Kondow, Tokyo; Junichi Inagaki, Fuchu; Eiichi Okamoto, Tokyo, all of Japan

[73] Assignee: Tokyo Shibaura Denki Kabushiki Kaisha, Kawasaki, Japan

[21] Appl. No.: 127,844

[22] Filed: Mar. 6, 1980

[30] Foreign Application Priority Data

Mar. 9, 1979 [JP] Japan .................. 54-26777

[51] Int. Cl.³ .................................. G06F 11/32
[52] U.S. Cl. ........................................ 364/200
[58] Field of Search ... 364/200 MS File, 900 MS File; 371/17

[56] References Cited

U.S. PATENT DOCUMENTS

| | | | |
|---|---|---|---|
| 3,659,273 | 4/1972 | Knauft et al. | 371/17 |
| 3,748,650 | 7/1973 | Garcia et al. | 364/200 |
| 3,813,531 | 5/1974 | King et al. | 371/17 |
| 3,879,712 | 4/1975 | Edge et al. | 364/200 |
| 3,937,938 | 2/1976 | Matthews | 371/17 |
| 4,016,543 | 4/1977 | Franks et al. | 364/200 |
| 4,067,059 | 1/1978 | Denchak | 364/200 |
| 4,075,691 | 2/1978 | Davis et al. | 364/200 |
| 4,166,290 | 8/1979 | Furtman et al. | 364/200 |

Primary Examiner—Gareth D. Shaw
Assistant Examiner—Eddie P. Chan
Attorney, Agent, or Firm—Kenyon & Kenyon

[57] ABSTRACT

In data processing apparatus in which address and data are transferred by means of DMA through an address bus and a data bus, a coincidence circuit determines whether the address on the address bus coincides with an address designated by an address designation device, a latch circuit latches the data on the data bus when the coincidence is detected and stores the latched data, and an indicating device indicates the data stored in the latch circuit.

4 Claims, 12 Drawing Figures

4,371,926

INPUT/OUTPUT INFORMATION INDICATION SYSTEM

BACKGROUND OF THE INVENTION

The present invention relates to a data processing apparatus having a direct memory access (DMA) function.

In data processing apparatus including a computer such as a minicomputer or a microcomputer used for protection or control of a system such as an electric power transmission system, a water supply system, or a rolling mill, information is transferred between an external device and a memory device in the data processing apparatus, either by the use of an input/output register under the control of the central processing unit (CPU), or by DMA, i.e., independently of the CPU. In the former system, the burden on the CPU is greater so that the performance of the CPU is lowered. The latter system is free from such a problem.

A DMA has two modes of operation. In a first mode, called a burst mode, operation of the CPU is interrupted while data is exchanged by the DMA. In a second mode, called a cycle steal mode, execution of the program by the CPU is carried out in parallel with the exchange of the data by DMA.

The information to be transferred between the external device and the memory device includes:
(a) information concerning the status of the system to be protected or controlled.
(b) information concerning setting values used as reference values for data processing, and
(c) an output of the contents of the memory device.

The information transferred between the external device and the memory device is required to be monitored for ensuring satisfactory operation and maintenance of the system to be protected. The monitoring has to be carried out without affecting the speed of data processing, and without interfering with protection and control functions, and hence independently of the operation of the CPU.

SUMMARY OF THE INVENTION

An object of the present invention is to provide data processing apparatus with an indicating device which indicates the information transferred by DMA between an external device and a memory device in the data processing apparatus, independently of the operation of the CPU, to enable ready monitoring of the information.

According to the invention, there is provided data processing apparatus in which an address of a memory device and data are transferred by means of direct memory access through an address bus and a data bus, respectively, comprising:

an address designation device for designating an address, a coincidence circuit for determining whether the address designated by the designation device and the address on the address bus coincide with each other, a latch circuit for taking in the data on the data bus when the coincidence circuit detects the coincidence and for storing the data so taken in, and an indicating device for indicating the data stored in the latch circuit.

DESCRIPTION OF THE PREFERRED EMBODIMENTS

Figures 1, 2B, 2C, 3D:
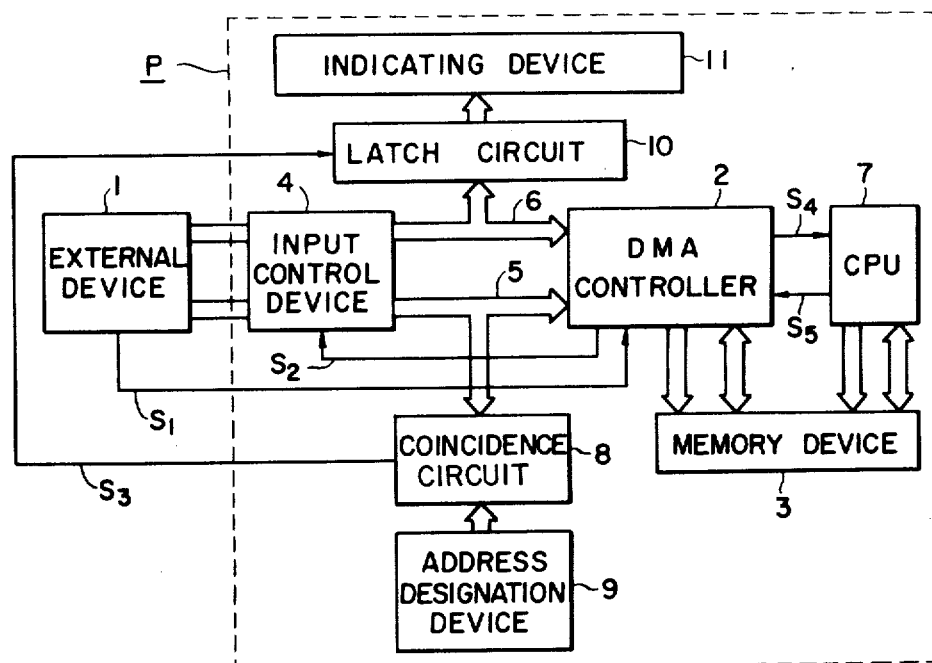
FIG. 1 is a block diagram showing an embodiment of the invention.
FIGS. 2A through 2C and 3A through 3D are timing diagrams of signals present during operation of the apparatus shown in FIG. 1.

In FIG. 1, there is shown data processing apparatus P connected to an external device 1. Information is transferred from the external device 1 to a memory device 3 by direct memory access (DMA). More particularly, the address and the data are transferred through an input control device 4, an address bus 5 and a data bus 6 respectively, and a direct memory access controller (DMA controller) 2, to a memory device 3.

The memory device 3 is also connected to a central processing unit (CPU) 7 so that address can be transferred from the CPU 7 to the memory device 3 and data can be transferred between the CPU 7 and the memory device 3.

A DMA request signal $S_1$ is sent from the external device 1 to the DMA controller 2. A DMA permission signal $S_2$ is sent from the DMA controller 2 to the input control device 4.

A coincidence circuit 8 is connected to the address bus 5 and to an address designation device 9, by which an address can be designated, and receives and compares the address from the address bus 5 and the address from the address designation device 9. When the two addresses coincide with each other, a coincidence indication signal $S_3$ is sent from the coincidence circuit 8 to a latch circuit 10. The latch circuit 10, when triggered by the coincidence indication signal $S_3$, latches the data present on the data bus 6 and stores it until the subsequent trigger. A display device 11 receives the data stored by the latch circuit 10 and displays it. Thus the display device 11 displays the DMA data corresponding to the address designated by the address designation device 9.

Interlock signals $S_4$ and $S_5$ are exchanged between the CPU 7 and the DMA controller 2 so that, when either the CPU 7 or the DMA controller 2 is using the memory device 3, the other is prevented from such use.

Figure 2A:
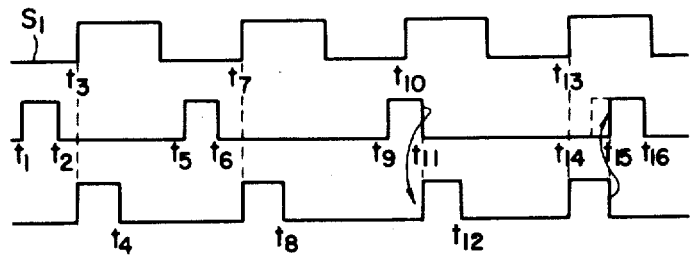

The DMA request signal $S_1$ is shown in FIG. 2A. The time intervals in which the CPU 7 is making access to the memory device 3 are shown in FIG. 2B and the time intervals in which the DMA controller 2 is making access to the memory device 3 are shown in FIG. 2C.

During the period of time from $t_1$ to $t_8$, the DMA request signal $S_1$ is produced at times $t_3$ and $t_7$ when the CPU 7 is not using the memory device 3, so that, responsive to the DMA signal $S_1$, the DMA permission signal $S_2$ is given to the input control device 4 and access by the DMA controller 2 to the memory device 3 is commenced immediately after the DMA request signal $S_1$ is produced.

If the DMA request is made at a time $t_{10}$ during the period of time $t_9$ through to $t_{11}$ when the memory device 3 is used by the CPU 7, use of the memory device 3 by the DMA controller 2 is delayed until the CPU 7 ceases using the memory device 3.

If the access request by the CPU 7 is made at a time $t_{14}$ during the period of time $t_{13}$ to $t_{15}$ when the memory device 3 is already used by the DMA controller 2, use of the memory device 3 by the CPU 7 is delayed until the DMA controller 2 ceases using the memory device 3.

Thus, priority in use of the memory device 3 is given to the CPU 7 or the DMA controller 2 whichever has given the access request earlier than the other, and the DMA is carried out in parallel with processing by the CPU 7 according to the program.

Figure 3A:
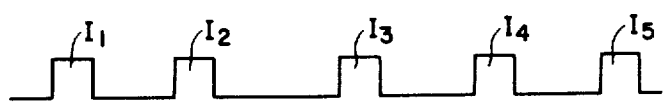
Figure 3B:

In FIG. 3A, the time intervals in which the address is placed on the address bus 5 are shown in $I_1$–$I_5$, each of which corresponds to the time interval $t_3$ to $t_4$, or the like, in FIG. 2C. The particular addresses placed on the address bus 5 in the respective time intervals $I_1$–$I_5$ are schematically shown by l-p in FIG. 3B. Assuming that the address designated by the address designation device 9 is "n", the coincidence circuit 8 produces an output $S_3$ (FIG. 3C) when the address on the address bus 5 is "n". Responsive to the output $S_3$, the latch circuit 10 latches the data present on the data bus 6, and substitutes the new data for the old data which has been stored since the previous latch.

The display device 11 displays the data stored by the latch circuit 10, so that the data being displayed is altered, from D' to D as schematically shown in FIG. 3D, when the latch circuit 10 is triggered by the signal $S_3$. The display device 11 may comprise conventional electric lights, or light-emitting diode indicators. The display device 11 may comprise a printer. Accordingly, the term "indicating device" used herein is intended to cover both a display device and a priner.

As has been described, even when the CPU 7 is executing a program, the information transferred by DMA is indicated to enable monitoring. Particularly, where a set value is sent by DMA to the memory device 3, the set value can be monitored and hence the reliability of the system is improved.

Figure 3C:
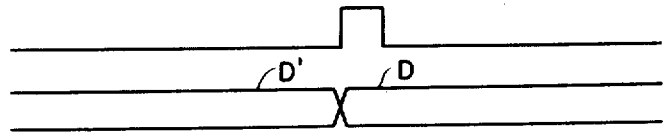
Figure 4:
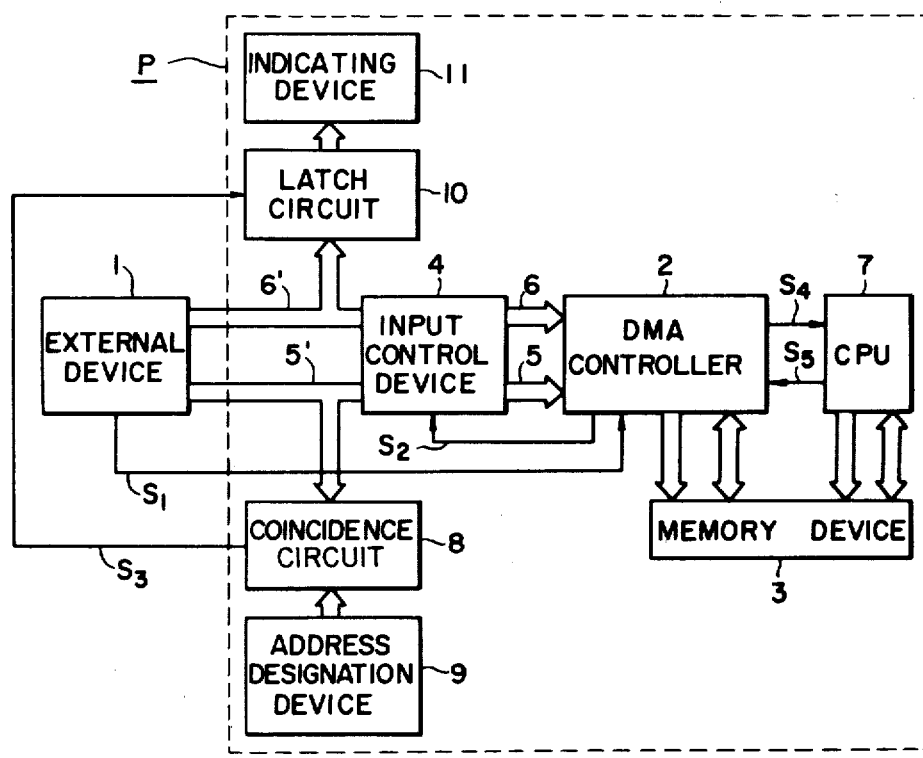
FIG. 4 is a block diagram showing another embodiment of the invention.
Figure 5A:
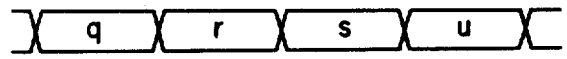
FIGS. 5A through 5C are timing diagrams of signals present during operation of the apparatus shown in FIG. 4.
Figure 5B:
Figure 5C:
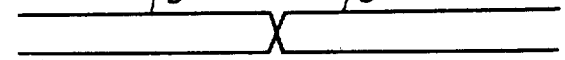

Another embodiment of the invention is shown in FIG. 4, in which the coincidence circuit 8 is connected to an address bus 5' interconnecting the external device 1 and an input control device 4. Similarly, the latch circuit 10 is connected to a data bus 6' interconnecting the external device 1 and the input control device 4. Regardless of whether the input control device 4 is permitting DMA or not, the address and the data are placed on the buses 5' and 6'. The address and the data are changed in accordance with a program from q through u, as shown in FIG. 5A. Assuming that the address designated by the address designation device 9 is "s", the coincidence device 8 produces a signal $S_3$ (FIG. 3B) as long as the address on the bus 5' is "s". The data D corresponding to the address "s" is stored by the latch circuit 10 in substitution for the old data D' (FIG. 3C).

In the embodiments shown in FIGS. 1 and 4, the address is produced by the external device 1, and given to the DMA controller 2. But, the invention is applicable to a system in which the address originates from the DMA controller 2 and is given to the external device.

The invention is applicable, not only to a system which uses the cycle steal DMA mode described above, but also to a system which uses the of burst mode DMA.

In the system shown above, information is written into the memory device 3 by DMA, but the invention can be applied to a system wherein an information is read out of a memory device 3 or wherein an information is transferred in both directions through buses.

What is claimed is:

1. An input/output information indication system for a data processing system in which information transfer between an external device and a memory device coupled to a central processing unit is controlled by direct memory access, said data processing system including the central processing unit, the memory device, an input control device, a direct memory access controller for exercising direct memory access control over said memory device, and a bus system coupling the central processing unit and the memory device said bus system further coupling the direct memory access controller and the memory device another bus system including an address bus and a data bus coupling said direct memory access controller and the external device via the input control device, said direct memory access controller in response to a control signal transferring between the direct memory access controller and the central processing unit transferring an address and data, respectively, constituting input/output information between the memory device and the external device via the input control device independently of the operation of the central processing unit when said memory device is under direct memory access control of said direct memory access controller, said input/output information indication system comprising:

an address designation device for designating an address which corresponds to a memory location in the memory device when said memory device is under direct memory access control;

a coincidence circuit coupled to said address designation device for receiving said designated address therefrom and coupled to said address bus for receiving addresses corresponding to memory locations in the memory device appearing on said address bus when the memory device is under direct memory access control, and producing a coincidence signal when the address from said address designation device and an address present on said address bus coincide;

a latch circuit coupled to said coincidence circuit and said data bus for latching the data appearing on said data bus when said latch circuit receives the coincidence signal; and an indicating device coupled to said latch circuit to receive latched data therefrom and indicate the same.

2. An indication system as set forth in claim 1, wherein said another bus system comprises an external bus system coupling the external device and the input control device and an internal bus system coupling the input control device and the direct memory access controller, said address bus and said data bus being part of said internal bus system and coupling said input control device and said direct memory access controller, said coincidence circuit and said latch circuit being respectively coupled to said address bus and said data bus, said data processing system further comprising means for transferring control signals between the direct memory access controller and the central processing unit, between the direct memory access controller and the input control device and between the direct memory access controller and the external device, the external device outputting an address and data on said external bus system to the input control device and a control signal requesting permission for writing data into said memory device to the direct memory access controller on said means for transferring, said direct memory access controller outputting on said means for transferring a control signal to said input control device for enabling writing of data into said memory device by direct memory access when said memory device is not being used by said central processing unit and a signal to said central processing unit for preventing said central processing unit from using said memory device, said input control device receiving addresses and data on said external bus system and outputting the addresses and data to the address bus and the data bus, respectively, of said internal bus system when said control signal for enabling writing of data into said memory device by direct memory access is received by said input control device.

3. An indication system as set forth in claim 1, wherein said another bus system comprises an external bus system coupling the external device and the input control device and an internal bus system coupling the input control device and the direct memory access controller, said address bus and said data bus comprising said external bus system and coupling the external device and said input control device, said coincidence circuit and said latch circuit being respectively coupled to said address bus and said data bus, said data processing system further comprising means for transferring control signals between the direct memory access controller and the central processing unit, between the direct memory access controller and the input control device and between the direct memory access controller and the external device, the external device outputting an address and data on said address bus and said data bus, respectively, to the input control device and a control signal requesting permission for writing data into said memory device to the direct memory access controller on said means for transferring, said direct memory access controller outputting on said means for transferring a control signal to said input control device for enabling writing of data into said memory device by direct memory access when said memory device is not being used by said central processing unit and a control signal to said central processing unit for preventing said central processing unit from using said memory device, said input control device receiving addresses and data on said address bus and data bus, respectively, and outputting the addresses and data to said internal bus system when said control signal for enabling writing of data into said memory device by direct memory access is received by said input control device.

4. An indication system as set forth in claim 1, 2 or 3, wherein said external device comprises a device for generating setting value data used as reference values for data processing by the central processing unit.

* * * * *